June 8, 1926.
G. M. BARTLETT
1,587,934
FUNNEL ATTACHMENT FOR PAILS
Filed Nov. 11, 1925
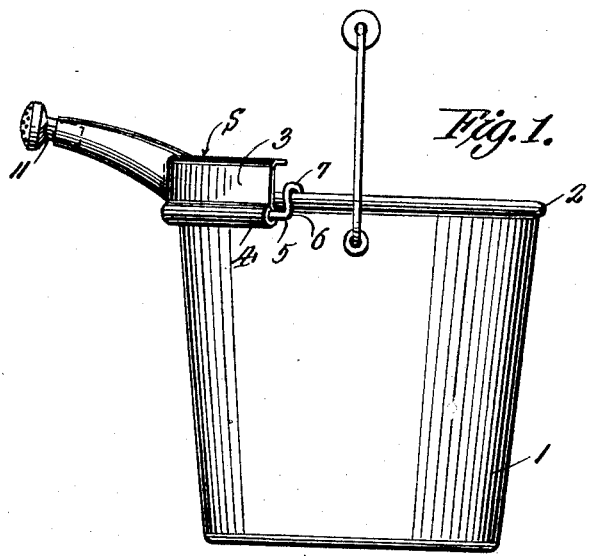
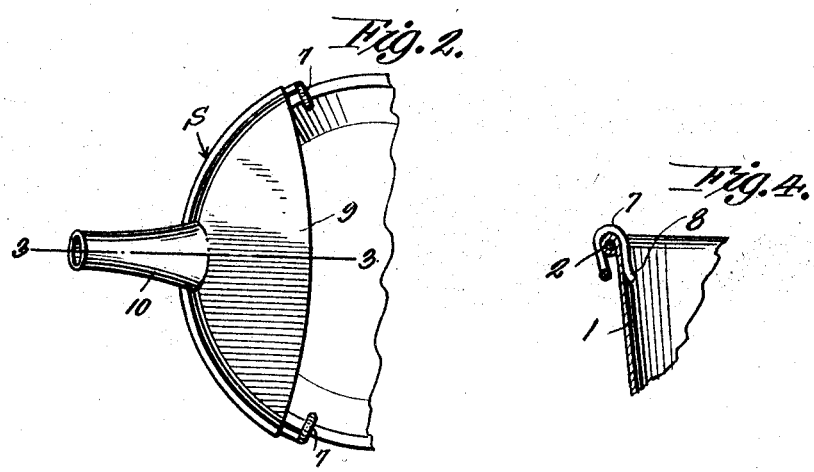
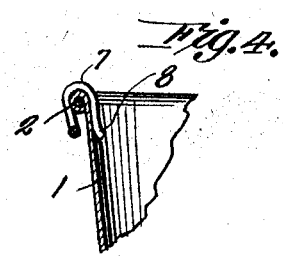
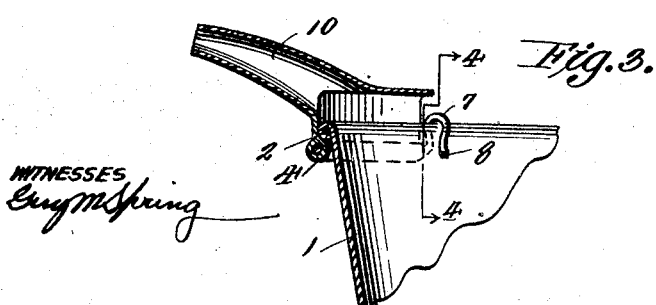
Inventor
GAIL M. BARTLETT Patented June 8, 1926.

1,587,934

UNITED STATES PATENT OFFICE.

GAIL M. BARTLETT, OF DETROIT, MICHIGAN.

FUNNEL ATTACHMENT FOR PAILS.

Application filed November 11, 1925. Serial No. 68,426.

This invention relates to detachable spouts for pails or buckets and has for its object the production of a simple and efficient detachable spout which may be readily attached to or detached from a bucket or pail.

Another object of this invention is the production of a simple and efficient spout which may be conveniently and efficiently attached to a pail or bucket for the purpose of filling automobile radiators and the like.

A still further object of this invention is the production of a simple and efficient detachable spout which is also provided with a sprinkler nozzle for permitting the pail to be used as a sprinkler when so desired.

With these and other objects in view, this invention consists of certain novel constructions, combinations and arrangements of parts as will be hereinafter fully described and claimed.

In the drawings:

Figure 1 is a side elevation of the pail showing the detachable spout secured thereto.

Figure 2 is a top plan view of the pail showing the detachable spout mounted thereon.

Figure 3 is a section taken on the line 3—3 of Figure 2.

Figure 4 is a section taken on line 4—4 of Figure 3.

By referring to the drawings, it will be seen that 1 designates the pail or bucket of any suitable or desired construction which is provided with the usual rolled rim 2 such as is common in all metallic buckets.

A detachable spout S is adapted to be detachably secured to the upper edge of the bucket or pail 1 and this detachable spout S comprises a segmental rim 3 which has its lower edge rolled as indicated at 4 for the purpose of housing a supporting and bracing wire 5. This supporting and bracing wire 5 has its extremities or ends upturned as indicated at 6, these upturned ends terminating in hook portions 7 as indicated clearly in Figures 1, 3 and 4, the hook portions 7 being turned inwardly for the purpose of overhanging the upper rim 2 of the pail 1. The extreme ends 8 of the hooks 7 are preferably bent slightly outwardly for the purpose of facilitating the placing of the hook 7 over the upper edge or rim 2 of the pail 1 as will be evident by considering Figure 4.

This rim 3 terminates at its upper edge in a shielding web 9 which extends from one end of the rim 3 to the other and is adapted to overhang a portion of the top of the pail 1 as clearly illustrated in Figure 2, for the purpose of preventing the liquid within the pail 1 from being spilled over the top of the spout while the liquid is being poured therefrom. The rim 3 is provided with a projecting spout 10 as clearly shown in the drawings, and a suitable detachable nozzle 11 may be employed when it is so desired for the purpose of using the spout as a sprinkler.

From the foregoing description, and by carefully considering the drawings, it will be seen that a very simple and efficient detachable spout has been produced which may be made very cheaply out of sheet metal and may be conveniently pressed in the desired shape and attached to a pail so as to permit liquid to be conveniently and easily poured from the pail without spilling over the side edges thereof. Consequently, a very simple and efficient device has been produced for the purpose of filling automobile radiators as well as sprinkling the body of an automobile for the purpose of cleaning the same should a hose be inconvenient or impossible of access. By carefully considering Figure 3 it will also be seen that the rolled portion 4 of the spout will be firmly clamped under the rolled portion 2 of the pail 1 by fitting the hook portions 7 over the upper edge of the pail 1, thereby constituting an efficient seal for preventing liquid from leaking out under the bottom of the spout while the liquid is being poured from the spout.

It of course, should be understood, that the present device may be employed for other purposes than filling radiators. In fact, the device is adaptable for any purpose wherein a receptacle having a small neck is employed and which it is desired to fill.

Having described the invention, what is claimed is:

1. A detachable spout for use in connection with pails, buckets and the like, comprising a segmental body having a rolled lower edge, a reinforcing wire extending through and beyond said rolled lower edge, the ends of said wire terminating in upwardly extending rearwardly projecting hooks adapted to overhang the upper edge of a pail, and a discharge spout portion secured to said rim.

2. The combination with a pail, having a rolled upper edge formed upon the outer face of the pail, of a detachable spout comprising a segmental rim terminating in a lower rolled edge adapted to abut against the under face of the rolled edge of the pail, and a reinforcing wire extending through and beyond said rolled lower edge, the ends of said reinforcing wire terminating in upwardly extending rearwardly projecting hooks adapted to overhang the upper edge of the pail for firmly binding the rolled portion of the spout in engagement with the rolled portion of the rim, an overhanging shield carried by the upper end of the rim for preventing the spilling the liquid from the pail as the liquid is being poured through the detachable spout, and a spout portion carried by said rim.

In testimony whereof I affix my signature.

GAIL M. BARTLETT.